Jan. 20, 1959            E. BÜHRER            2,869,193
ATTACHMENT FOR MOULDING MACHINES WITH MECHANICALLY
DRIVEN INTERMITTENTLY ROTATING TURNTABLE
Filed April 20, 1954            6 Sheets-Sheet 1
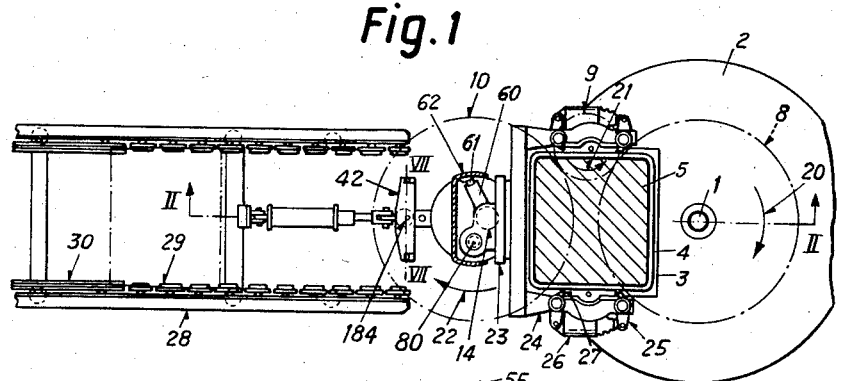
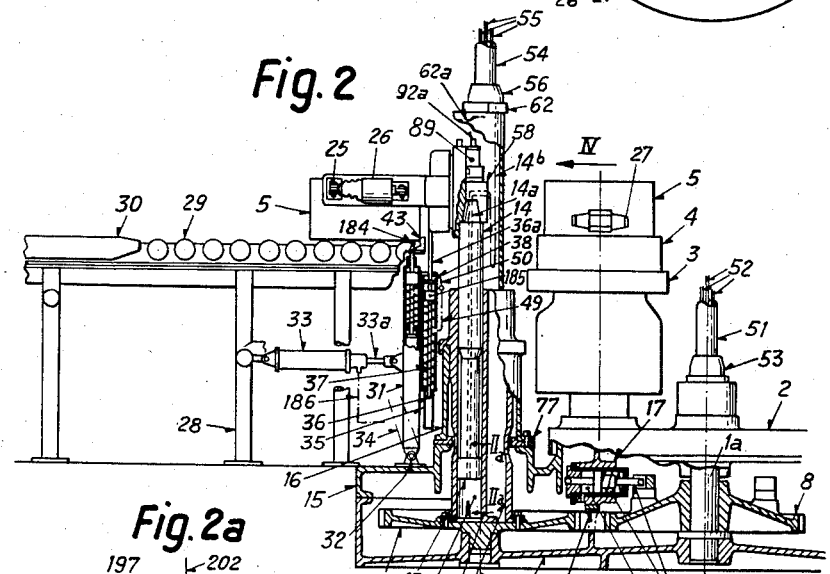
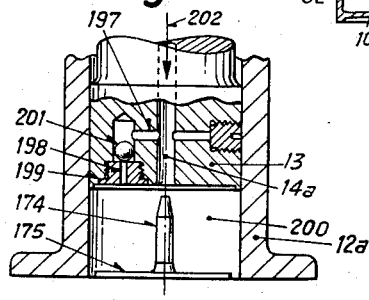
INVENTOR:
ERWIN BÜHRER Jan. 20, 1959 E. BÜHRER 2,869,193
ATTACHMENT FOR MOULDING MACHINES WITH MECHANICALLY
DRIVEN INTERMITTENTLY ROTATING TURNTABLE
Filed April 20, 1954 6 Sheets-Sheet 3

INVENTOR:
ERWIN BÜHRER

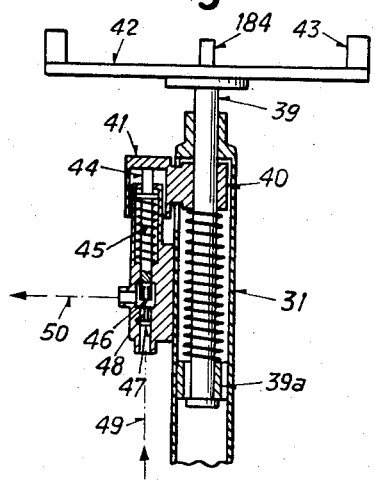
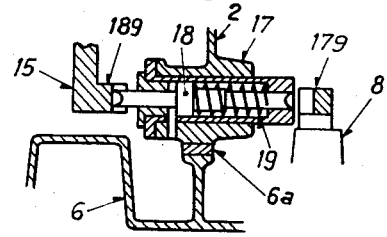
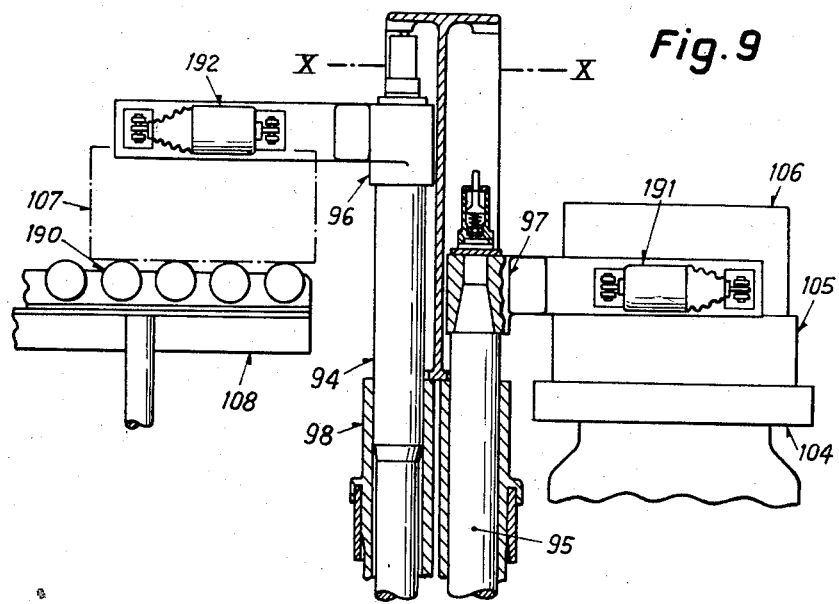

Jan. 20, 1959            E. BÜHRER            2,869,193
ATTACHMENT FOR MOULDING MACHINES WITH MECHANICALLY
DRIVEN INTERMITTENTLY ROTATING TURNTABLE
Filed April 20, 1954            6 Sheets-Sheet 5
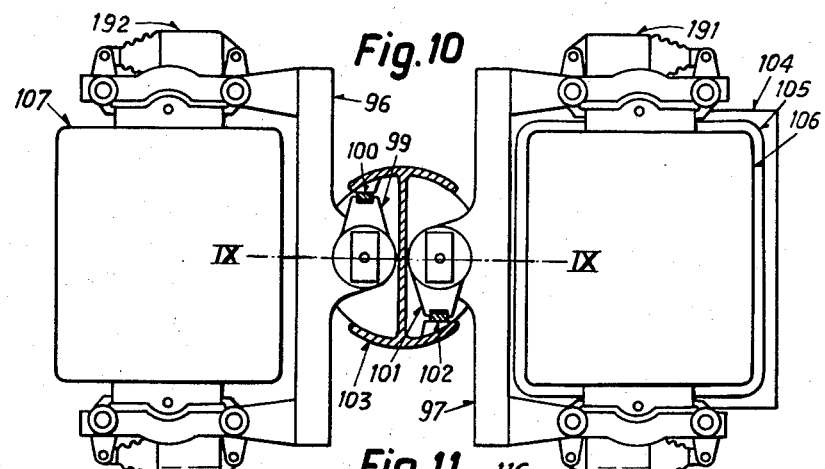
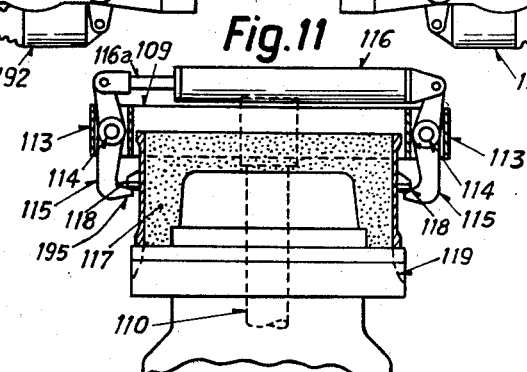
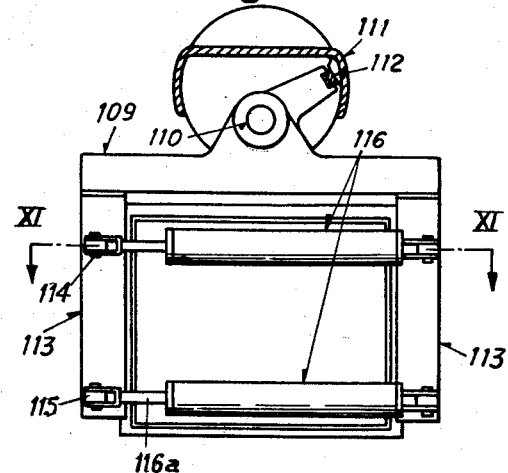
INVENTOR:
ERWIN BÜHRER Jan. 20, 1959 E. BÜHRER 2,869,193
ATTACHMENT FOR MOULDING MACHINES WITH MECHANICALLY
DRIVEN INTERMITTENTLY ROTATING TURNTABLE
Filed April 20, 1954 6 Sheets-Sheet 6

INVENTOR:
ERWIN BÜHRER

United States Patent Office 2,869,193
Patented Jan. 20, 1959

2,869,193

ATTACHMENT FOR MOULDING MACHINES WITH MECHANICALLY DRIVEN INTERMITTENTLY ROTATING TURNTABLE

Erwin Bührer, Schaffhausen, Switzerland

Application April 20, 1954, Serial No. 424,445

Claims priority, application Switzerland January 12, 1954

19 Claims. (Cl. 22—21)

The present invention relates to an attachment for moulding machines with a mechanically driven, intermittently rotating turntable which carries at least two pattern equipments.

A known type of moulding machine is that which has a mechanically driven, intermittently advanced series of pattern equipments and moulding boxes and which carries the moulds already lifted off the pattern equipment, away from the turntable in a bogie. These attachments have the disadvantage that they require extensive slide ways and have to be operated by means of ropes; therefore they have only been suggested for hand-controlled turntables. The attachment already suggested is in operative connection only with the pattern equipment lift mechanism. The empty moulding boxes cannot be fed with it. This suggested method has not succeeded in being generally accepted in practice.

Also known for moulding machines with a mould table are appliances or devices which either can remove moulds by means of hand-operated conveyor bogie or by means of swivel arms swung by hand or can feed empty moulding boxes. None of these devices fulfills the preliminary conditions necessary for them to be suitably used in the case of moulding machines with intermittently rotating turntables.

A further known method in the case of moulding machines with a mechanically driven, intermittently rotating turntable which carries at equal distances the pattern equipments necessary for the production of moulds, is to feed empty moulding boxes to the said machines by means of a supply conveyor roller, to remove finished moulds by means of a lift mechanism arranged on the turntable and to take the said moulds away from the turntable by means of a discharge roller-type conveyor. Since in this case the moulds are removed from the pattern equipment by means of roller-type conveyors, and since, depending on the state of the moulding boxes when the moulds are lifted from the pattern equipment, the said moulds tilt, and since, furthermore, the empty moulding boxes have to be lowered on to the pattern equipment via the guide dowels by their own weight and without being secured against titlting, breakdowns occur during the mounting of empty moulding boxes and damage results during the removing of finished moulds which are difficult to lift and to remove from the turntable.

A further known method is, in the case of turn-over-table moulding machines, to raise, turn over and swing clear the pattern equipment plate together with the moulding boxes lying on it by means of an attachment which is controlled mechanically or by a pressure medium.

Also known are attachments for the mechanical mountig and taking off, turning over and positioning of moulding boxes on or from moulding machines operating singly or in conjunction with an assembly line, in which an articulated parallelogram-shaped carrier is rotatable about a perpendicular axis.

In none of the abovementioned types do all the parts of a moulding machine work together fully automatically and in predetermined timed relation.

The object of the present invention is to combine at least the lifting off of the finished moulding boxes from a turntable fully automatically with the functions necessary for the production of the mould.

The invention is more specifically directed to an attachment arranged in operative connection with the turntable so designed that it can be swung in over the said turntable, and possesses controlled devices which are in operative connection with the said turntable, the attachment including at least devices with which to grip the mould, lift it off if need be, and carry it away.

Figs. 1 to 8 illustrate a typical example of the attachment for gripping the mould and carrying it away from the turntable, and of said attachment's mechanically arranged operative connection with said turntable. In the attached drawing:

Fig. 1 is a plan view of an attachment for gripping a finished mould and carrying it away from the turntable, and of said attachment's operative connection with the said turntable;

Fig. 2 is an elevational view of the attachment and turntable, partly in section along the line II—II of Fig. 1;

Fig. 2a is a partly sectional view taken along the line IIa—IIa of Fig. 2;

Fig. 3 is a section along line III—III in Fig. 6 through the turnover head of the moulding box holder, together with the drive for turning over the said holder;

Fig. 4 is a view of the turnover head seen in the direction of the arrow IV in Fig. 2, partly in section.

Fig. 5 is a section through the turnover head along the line V—V in Fig. 6;

Fig. 6 is a section through the turnover head along the line VI—VI in Fig. 5;

Fig. 7 is a section along the line VII—VII in Fig 1;

Fig. 8 is a partial, sectional view of the turntable locking mechanism from Fig. 2;

Figs. 9 and 10 show an alternative type wherein two piston rods are arranged in a rotary column, to which rods moulding box holders are secured which are vertically movable at 180° to each other and independently of each other, Fig. 9 being a sectional view taken along the line IX—IX in Fig. 10;

Fig. 10 is a plan view of Fig. 9, partly in section along the line X—X in Fig. 9;

Fig. 11 is an alternative device for gripping the mould, shown in section along the line XI—XI in Fig. 12;

Fig. 12 is a top view of Fig 11;

Figure 3:
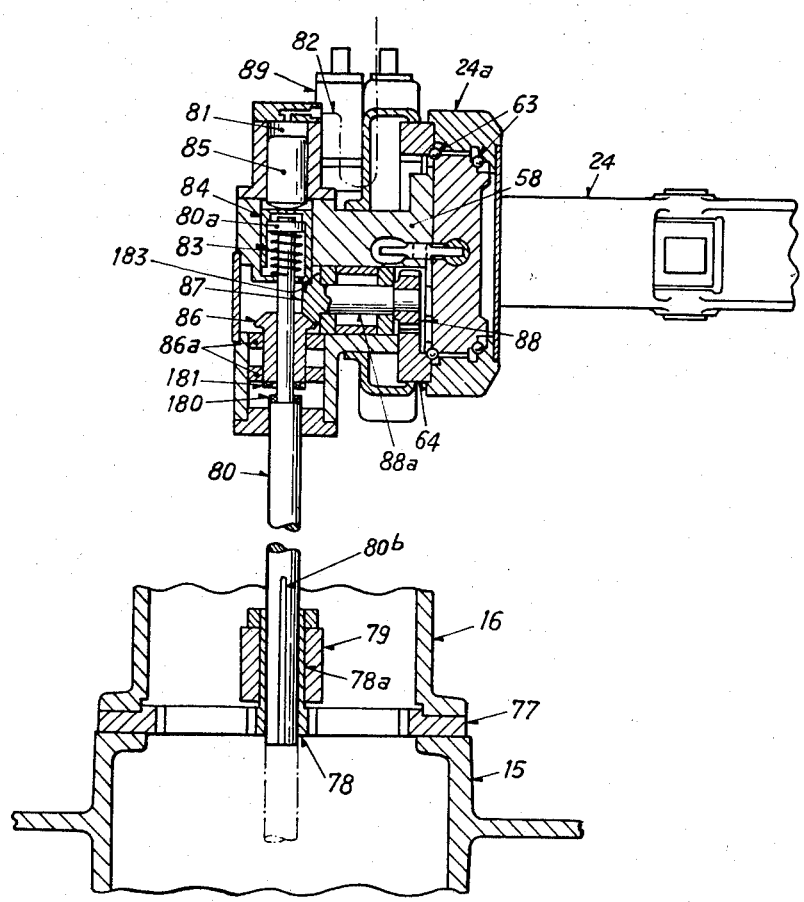

Referring now more particularly to the drawings there is shown in Figs. 1 and 2, a vertical axis of rotation 1 about which a turntable 2 turns. On the latter is shown a mould table 3, a mould device 4, and a finished mould 5. The turntable 2 is supported on the track 6a of the machine frame 6 and is centered on the axis of rotation 1 which forms at the same time the bearing for a driving wheel 8. The latter is driven by a motor, which is not described in detail, and via a coupling turns the turntable 2 one unit each time, that is to say 180°, if the turntable possesses two moulding devices. Via the gear wheel 9 wheel 8 drives the wheel 10 connected to the rotary column 12 which turns in the same direction as the turntable. Arranged on a lug 17 of the turntable is an air-operated locking bar 18 (see also Fig. 8) which is designed as a piston and is shifted towards the axis of rotation 1 by means of compressed air and is forced back into its initial position by a spring 19 when the pressure of said air is released. This locking bar 18 first couples the turntable 2 with the wheel 8 so that the former can be driven by the latter, and then it couples the turntable with the base frame 15, the wheel 8 running idle and only the rotary column 12 turning through 180°.

The arrows 20 and 22 (Fig. 1) indicate the direction of rotation of the wheels 8 and 10, and the arrow 21 that of the intermediate wheel 9. The rotary column 12 is located in the bushing 16 which is screwed to the base frame 15. The latter is screwed on to the machine frame 6. Arranged in the said column is a cylinder 12a for a piston 13 the rod 14 of which serves as carrier for the moulding box holder. If the lifted off mould is a drag part, it must be turned over before being deposited on a conveyor device. For this purpose the moulding box holder is rotable about a horizontal axis, that is to say, it is connected to the piston rod 14 via a turnover head which is described later.

In Fig. 2a, 175 indicates a disc, lying loosely at the bottom of cylinder 12a and to which is fixed a pin 174. In the piston 13 there is a hole or bore 14a into which the pin 174 penetrates when the piston 13 is lowered. The diameter of pin 174 is slightly smaller than that of hole 14a. A further hole or bore 197 and a hole or bore 198, which is in an inserted part 199, also connect the piston compartment 200 to the hole 14a. When the piston 13 is lowered, a ball 201 is raised by the pressure in the compartment 200 and thus, after the pin 174 has penetrated into the hole 14a, the compartment 200 is connected to the hole 14a via the holes 197 and 198. When the piston 13 is raised, a pressure medium flows in the direction of the arrow 202 towards the piston compartment 200. Since the ball 201 comes to rest on the hole 198, a throttled upward movement occurs in the first part until the piston 13 has risen so far that the pin 174 no longer projects into the hole 14a, because the compressed air can only flow through the small space between pin 174 and hole 14a.

A stand 28, which is supported on the foundation, carries rollers 29 and brake rails 30. A pushing out device 31, (Figs. 2 and 7) which is swivelly held in the bearing 32, is actuated by the piston rol 33a of a cylinder 33 in such a way that it can be moved either into the position shown in Fig. 2 or else into the position 34, indicated by dotted lines. Built on to this pushing-out device is a braking cylinder 35 with piston rod 36 and return spring 37. The braking cylinder 35 is filled with braking fluid to the level 38 and the top end 36a of the said cylinder's piston rod 36 thrusts against the moulding box holder and brakes it when it is being lowered. A guide rod 39, which is firmly connected to a holder 40 and a sleeve 41, carries a cross-piece 42 to which the pushing-out cams 43 are secured. A spring 45 presses the bolt 44 against the sleeve 41. At the bottom end of the bolt 44 there are throttle passage openings 46. A cross-piece 47 in the pipe 49 has a pin 48 which serves to throttle the passage openings 46 which throttle the pipe 49. The latter conveys the oil driven out below the piston 185 through these throttled openings to the pipe 50 and from the latter to above the piston 185. The mode of operation of this device is described later.

In Fig. 2, 51 indicates a holding tube which is arranged in the extension of the shaft 1a and conveys via a rotary slide valve 53 to the turntable 2 as many air pipes 52 as are required for all the functions of the parts mounted on the said turntable. As can also be seen in Fig. 2, 54 indicates another holding tube which contains as many air pipes 55, which are conveyed via a rotary slide valve 56, as are necessary for the functions of all the parts turning about the axis of rotation 11. These rotary slide valves have the sole purpose of delivering to the corresponding working points compressed-air which is controlled by a control unit not described in detail.

Figure 6:
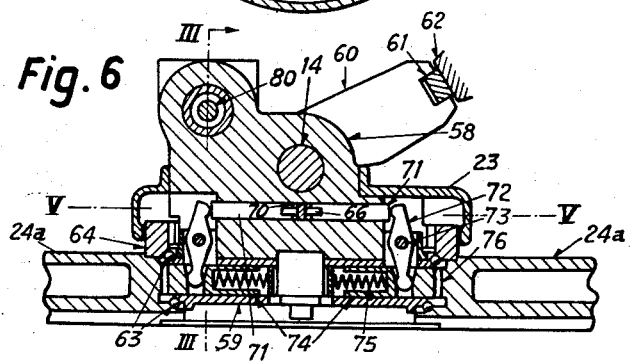

Figs. 1 and 2 show the turnover head 23 on the machine and Figs. 3, 4, 5 and 6 show details of the said head. The turnover head 23 carries the moulding box holder, which is in the form of a U-shaped frame 24 on which clamp levers 25 are located. The latter can be actuated by the cylinders 26 flexibly attached to them and can grip the moulding box with the finished mould via the surfaces 27. The piston rod 14 has a hole or bore 14a for the compressed-air which is connected to the rotary slide valve 56 via the tube 14b. The body 58 (Fig. 6) is positioned at the top end of the piston rod 14 and is firmly connected to another body 59. The separation of bodies 58 and 59 is only necessary for assembly reasons. Arranged on the body 58 is an arm 60 (Fig. 6) which has a groove projecting over a guide rod 61 which is secured to the part 62 (see Figs. 1 and 2). This guide prevents the piston rod 14, and the moulding box holder secured to the said piston rod, from turning in relation to the rotary column 12, since the latter and the part 62 are firmly interconnected. The U-shaped frame 24 (Figs. 1 and 2) possesses a ring 24a (Figs. 3 and 4) which is rotatably located on two ball faces 63 on the body 59. Secured to the ring 24a is an internal gearing 64 in which the gear wheel 88 engages. The said gear wheel 88 rests on the shaft 88a forming one piece with the bevel gear 87. The latter meshes with the bevel gear 86 which is rotatably supported on the shaft 89, is axially secured in the bearings 86a and can be coupled to the shaft 80 by the coupling halves 180—181. The lower part of the shaft 80 is provided with keyways 80b and penetrates shiftably the gear wheel 78 which engages with the internal gear 77 rigidly located between the bushing 16 and the base frame part 15. The wheel 78 has a bearing bushing 78a which is located in the bearing 79 so that it is axially immovable. The bearing 79 is secured to the inner wall of the column 12. If the column 12 turns, the shaft 80 also turns about the axis of the column and, in addition, it turns about its own axis. In order to lock the turning head 23 in the horizontal position of the frame 24, two slides 74 (Fig. 6) are provided which are forced by springs 75 into the notches 76 of the ring 24a. This connection is released by the bolt 66 (Figs. 3 and 5) the shoulder 68 of which is pressed by the spring 67 against the inner wall of the casing 65. The bolt 66 has two wedge-shaped surfaces 69 which act via the rollers 70 on the slides 71 which thrust against the two-armed levers 72 (Fig. 6). The latter are each rotatable about the bolt 73, abut with their outer arms against the slides 74 and pull the latter out of the notches 76 against the pressure of the springs 75. The bolt 66 is pressed inwards by a nose on the part 62a (Fig. 2) when the piston rod 14 reaches its highest position. If the frame 24 is to be swivelled, the shaft 80 must be coupled to the bevel gear 86. For this purpose the top end of the shaft 80 is provided with a disc 80a against which the spring 83, supported on the body 58, presses and forces the shaft 80 upwards until the coupling parts 180—181 engage each other. The disc 80a engages in a non-rotatable but axially shiftable bushing 84 on the bottom of which the compressed-air piston 85 acts when compressed-air is forced into the compartment 81 above the said piston by the pipe 82. Owing to the bushing 84 being pressed downwards it engages with a tooth 183 in the bevel gear 87 and prevents a turning of the wheel 87 which might be caused by friction.

Figure 4:
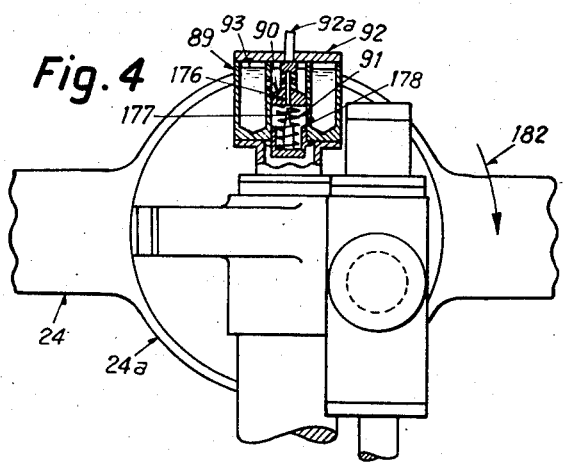
Figure 5:
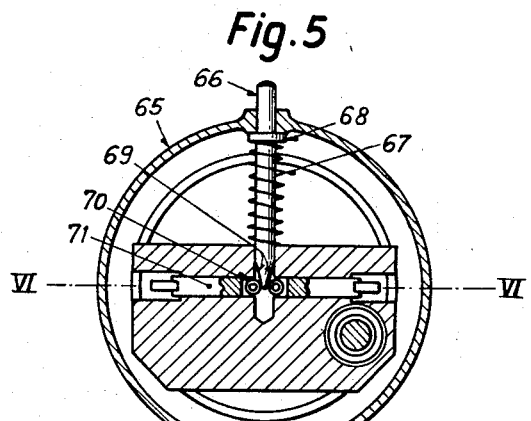

To prevent the piston rod 14 impinging sharply in its topmost position, a damper 89 is arranged on the fixed body 58 (see Figs. 2, 3 and 4). Built into the damper 89 is a piston 90, and end 92a of which thrusts against the rigid stop 62a (Fig. 2). The piston 90 is forced against the cover 92 by the spring 91. The damper 89 is filled with braking fluid up to the level 93. The function of this damper is described later.

The attachment illustrated in Figs. 1 to 8 operates as follows:

A finished mould 5 is above the pattern equipment 4, as is shown in Fig. 2. The turnover head 23 and the parts 24 to 26 connected thereto have been lowered into the position indicated in Fig. 1 so that the air feed hole 14a in the piston 13 projects over the pin 174 of the disc 175 in Fig. 2, whereby the air outlet is throttled. The cylinders 26 are not under pressure and thus the clamping levers 25 are in the open position. By operating a control unit which is not illustrated, pressure is applied to the cylinders 26 in the position shown in Fig. 1 via one of the pipes 55, the rotary slide valve 56 and pipes which are not visible. The clamp levers 25 bear against the surfaces 27 of the moulding box containing the finished mould 5 and keep the said box steady. By operating the control unit compressed-air is made to flow via bore 202 from the piston rod 14 to beneath the piston 13. At the same time vibrators, which are not illustrated and which gently shake the pattern-equipment are set in motion. Since the pin 174 shuts off the air admission openings as far as essential, the piston 13 is raised very slowly on purpose in the first phase of its movement. By making the pin 174 a suitable size and shape, the increase in speed can be controlled until the moment the pin 174 releases the outlet opening of the air feed from the piston 13 and enables the full speed of stroke to be attained. Shortly before the piston rod 14 reaches its topmost position, the piston part 92a of the piston 90 of the damper 89 (see also Fig. 4) thrusts against a stop surface of the part 62a (Fig. 2) in order to dampen the impact. The piston 90 is forced downwards and the braking fluid is compelled to flow through a hole 176 through the piston 90. A pin 177, which penetrates the hole 176 and is conical in shape, begins to narrow the cross-section of the hole 176 as the piston 90 sinks lower so that the speed of the piston rod 14 drops with a uniform decreasing motion to zero. In this position the piston 90 rests on the part 178 of the damper 89.

Furthermore, before the piston rod 14 reaches its highest position, the bolt 66 of the turnover head impinges against a stop surface of the nose 62a, which surface releases the locking of the turnover head. The bolt 66 is pressed downwards against the force of the spring 67 in Fig. 5 and the wedge-shaped surfaces 69 force the sliding bolts 71 apart via the rollers 70. Via the double levers 72 and against the elastic force of the springs 75 the sliding bolts 71 pull the locking bars 74 out of the notches 76 in the ring 24a of the U-shaped frame 24. Thus the turnover head 23 and with it the U-shaped frame 24, which was immovably locked against turning in all the lower positions of the piston rod 14, that is to say, also during the lifting of the mould 5 from the pattern equipment 4, are released for turning. If no turning over is to take place, the stop, against which the bolt 66 thrusts, is removed so that the turnover head remains locked.

Now, by means of the control unit the motor is set in motion which turns the drive wheel 8 in the direction of the arrow 20, the intermediate wheel 9 in the direction of the arrow 21 and the wheel 10 in the direction of the arrow 22 until the wheel 8 has turned the turntable 2 by another mould table division, in the present case 180°, and the wheel 10 has completed half a revolution. Fig. 2 illustrates the wheels as provided for a turntable 2 with two mould tables 3. The locking bar 18 (Fig. 8), which is built into the turntable 2, is actuated by pressure controlled by the control unit. The said bar is in the position illustrated in Fig. 2. It couples the turntable to the wheel 8 via the coupling piece 179, whereby the turntable 2 is also turned. While the next mould table of the turntable 2 is replacing the mould table 3, the finished mould 5 is at the same time swung in its raised position over the stand 28. For this purpose the air feed to the cylinder compartment 81 (Fig. 3) is shut off by means of the control unit so that the said compartment has no pressure. In this way the spline shaft 80 and thus the piston 85 are as a result of the pressure of the spring 83, in their highest position in which the coupling parts 180—181 engage in one another so that the spline shaft 80 is coupled to the bevel gear. The gear wheel 78, which is located in the bearing 79, meshes with the fixed, internally toothed wheel rim 77 which is firmly connected to the machine frame 15. Since the bearing 79 is firmly connected to the rotary column 12 (Fig. 3), the gear wheel 78 (Fig. 3) also turns with the rotary column 12 and hobs with the internally toothed wheel rim 77, and thus turns the spline shaft 80. Via the spline shaft 80, the bevel gears 86 and 87, and the spur gear 88 the internally toothed wheel rim 64 is turned. Since the latter is firmly connected to the U-shaped frame 24, the said frame is not only turned together with the wheel 10 in the direction of the arrow 22 about the axis of the rotary column 12 (Figs. 1 and 2), but also at the same time it is turned over in the direction of the arrow 182 in Fig. 4.

If the cylinder compartment 81 (Fig. 3) is under pressure, the piston 85 and thus the spline shaft 80 are forced into the position illustrated in Fig. 3. The couplings 180 and 181 of the spline shaft 80, and the bevel gear 86 are disengaged. When the wheel 10 turns, the spline shaft 80 rotates without also revolving the bevel gear 86. At the same time a tooth 183 of the bushing 84, which is secured against turning, engages in the bevel gear 87 and locks all the parts that are in mesh with the bevel gear 87, that is to say, the U-shaped frame 24 as well. In this case, when pressure is applied to the cylinder compartment 81, the U-shaped frame 24, which carries the finished mould 5, is thus only turned in the direction of the arrow 22 in Fig. 1, and not, at the same time turned over in the direction of the arrow 182 in Fig. 4. When a turn is made in the direction of the arrow 22, a lifted off mould 5, for instance a lower part, is, depending on the position of the piston 85, swivelled and at the same time turned over, or if it is an upper part, it is only swivelled but not turned over.

If there is a mould 5 above the roller table stand 28 (Fig. 1) and if the piston rod 14 is in its highest position, the pressure beneath the piston 13 is drawn off by operating the control unit. The piston 13, the piston rod 14 and all the parts connected thereto, that is to say, the mould also which is held fast in the U-shaped frame 24, are lowered, Fig. 2 showing the moulding box 5 turned over in the lowered position. If the turnover head 23 impinges on the upper end 36a (Fig. 2) of the piston rod 36, the piston 185 secured to the said rod is pressed downwards against the elastic force of the spring 37. At the same time the braking fluid is compelled to flow from the compartment beneath the piston 185 via the pipes 49 and 50, indicated in Figs. 2 and 7, into the compartment above the piston 185. If the moulding box holding the mould impinges agahist the bolt 184, shown in Figs. 1, 2 and 7, the guide rod 39 and thus the holder 40, the sleeve 41 and the bolt 44 are pressed downwards. When a position is reached wherein the bolt 44 penetrates the hole of the pipe 49, the braking fluid passing through is compelled to flow towards the pipe 50 solely through a small hole 46 in the bolt 44. At the same time a conical pin 48, arranged on a cross flange 47, begins to narrow the passage through the hole 46. The conical pin 48 is so designed that the reduction effected by the said pin of the cross-section of the passage for the flow of the braking fluid decreases the lowering movement at a constant rate to practically zero, when the moulding box containing the finished mould 5 rests on the rollers 29. As soon as the finished mould 5 is lying on the rollers 29, the pressure is drawn off from the cylinders 26 by means of the control unit, and the springs located in the said cylinders but not illustrated open the clamp levers 25. By means of the control unit pressure is applied to the compartment beneath the piston 13, in the manner already described in the case of lifting the finished mould 5 from the pattern equipment 4. The piston rod 14, with all the parts located on it, is raised into its highest position. Now, pressure is applied to the cylinder 33 via a pipe 186 by means of the control unit. The pushing device 31 is moved out of the position marked in solid lines in Fig. 2 into the position 34 indicated by dotted lines in Fig. 2. When this happens, the cams 43 secured to the cross-piece 42 grip hold of the moulding box containing the finished mould and push the said box away into the position above the brake rails 30. The pressure in the cylinder compartment 188 (Fig. 2) is drawn off by means of the control unit. The locking bar 18 is moved into the position shown in Fig. 8 by the spring 19. In this way the turntable 2 is unlocked from the wheel 8 and locked via the coupling piece 189 to the machine frame 15, that is to say, the said turntable is blocked from turning in the direction of the arrow 20 (Fig. 1).

A motor controlled by means of the control unit turns the wheels in the manner already described and thus also turns the rotary column 12 and the parts secured thereto in the direction of the arrow 22 from the position above the roller table stand 28 into the position above the mould table 3. During this process, the wheel 8 runs idle and the turntable 2 remains locked against the machine frame 15. The pressure beneath the piston 13 is drawn off by means of the control unit. The piston rod 14, together with the U-shaped frame 24, drops into its lowest position, whereupon another mould is lifted off and carried away.

The arrangement illustrated in Figs. 9 and 10 also serves to lift off and carry away finished moulds. It differs from the arrangement shown in Figs. 1 and 2 in that two cylinders with pistons movable independently of each other are provided in the rotary column 98, and that here, for example, the turnover head 23 in Figs. 1 and 2 is replaced by rigid cross-pieces 96 and 97 arranged on the piston rods 94 and 95 respectively. The rotary column 98 in Fig. 9, which possesses two cylinders to receive the piston rods 94 and 95, is, however, guided and driven in exactly the same manner as the rotary column 12 in Fig. 2. The cross-piece 96 possesses a guide arm 99 which engages a guide rail 100 and secures the cross-piece 96, and thus the piston rod 94, against twisting. In the same way the cross-piece 97 is provided with a guide 101 which engages a guide rail 102 and keeps the cross-piece 97, and thus the piston rod 95, from twisting. The rails 100 and 102 are secured to the part 103 which, in its turn, is firmly connected to the rotary column 98. The cross-pieces 96 and 97 carry the same elements as have already been illustrated in Figs. 1 and 2 by 24 to 26. They are therefore not described in detail here. A mould table 104, which carries a pattern equipment 105 and a finished mould 106, is supported, as in Fig. 2, on a turntable which is not illustrated. A removed mould 107 has already been lowered on to the roller table 108. The latter and the pushing device, which is not illustrated, are similar to those in Figs. 1 and 2.

The two-cylinder arrangement illustrated in Figs. 9 and 10 differs in its mode of operation from the arrangement shown in Figs. 1 to 8 in that the turntable is driven directly by the wheel 8. The latter is firmly connected to the turntable 2 in the case of the attachment shown in Figs. 9 and 10. The locking device, as illustrated in Fig. 8, is omitted in this case. The turning movement of the turntable 2, which is not illustrated in Figs. 9 and 10, is, however, transmitted to the rotary column 98 in the manner shown in Fig. 2. The transmission ratio varies according to the number of mould tables on the turntable 2.

Let it be assumed that above the mould table 104, or above the finished mould 106, the grab of the cross-piece 97 is in the raised position and that its gripping levers are open (Fig. 10). Furthermore, the grab of the cross-piece 96 should also be in the raised position, but should be located over the roller table 108 and have a mould 107 clamped in it. By means of the control unit the air is drawn out from beneath the piston rod 95 so that the said rod drops into its lowest position, while the piston rod 94 with the clamped mould 107 is lowered only until the said mould rests on the rollers 190. These processes correspond, mutatis mutandis, to those described in connection with Fig. 2. By operating other air control slide valves by means of the control unit, pressure is applied to the cylinders 191, while the pressure is dawn off from the cylinders 192. The air is also controlled by means of the control unit in such a way as to raise the piston rod 95 and thus lift off the clamped finished mould 106 from the pattern equipment 105, while the grab of the piston rod 94 is raised into its highest position with gripping levers open. By setting the wheel 8 turning, the mould table which is not illustrated is turned another mould table division, while the raised, clamp mould 106 is swivelled over the roller table 108 and the grab located on the piston rod 94 moves into a position above the mould table following the mould table 104, whereupon the sequence of operations begins anew. The attachment in the examples described can be designed for swivelling alone, for swivelling and at the same time turning over, or for any desired combination of swivelling and turning over.

Figs. 11 and 12 illustrate a further typical example of the attachment for gripping the finished mould. Since the other parts are designed similar to those in Figs. 9 and 10, or, mutalis mutandis, to those in Figs. 1 and 2, although there is no turnover head in this case, only the following parts are shown here. A cross-piece 109, which is connected to the piston rod 110, is kept from twisting on the part 111 by means of the guide 112. Bearing arms 113 are firmly connected to the cross-piece 109. Located in the bearing arms 113 by means of bolts 114 are gripping, levers 115 to which cylinders 116 or piston rods 116a are pivotally secured. The gripping levers 115 grasp the finished mould 117 by the projecting parts 118 of the moulding box, either the gripping surfaces of the lever 115 or the lower surface of the projecting parts 118 or both sets of surfaces being so designed that the gripping surfaces of the levers 115 bear against the corresponding surfaces of the projecting parts 118, even though there are substantial inaccuracies in the reciprocal position of the said projecting parts owing to differences in height. As will easily be seen, the gripping levers 115 can, by providing slots 119, also be so designed that their gripping surfaces grasp the underneath side of the moulding box containing the finished mould 117.

Figs. 11 and 12 show an example of another possible method of gripping the finished mould in order to lift it off and remove it from the turntable. Double levers 115, which are power-operated by means of fluid under pressure via cylinders 116 and piston rods 116a, grip beneath projecting parts 118 of the moulding box containing a finished mould 117. In order to prevent the finished form from tilting when it is being gripped or lifted off, which may happen if there are differences in height, caused by damage or other circumstances between the gripping surfaces of the double levers 115 and those of the projecting parts 118, these gripping surface must fulfill special conditions. Care must be given to seeing that either the gripping surfaces of the double levers 115 or those of the projecting parts 118 or both sets of surfaces are designed in such a way that the underside of the box is still gripped perfectly when the gripping surface of the projecting parts 118 are at their lowest possible height and when the said parts coincide with the highest possible gripping surface of the double lever 115.

Furthermore, the tips 195, after gripping has been effected, must not yet impinge on the wall of the moulding box containing the mould 117, if by chance the projecting part 118 in its highest position coincides with the gripping surface of the double lever 115 in the said surfaces lower position. This is suitably achieved by arranging the gripping surfaces so that they are inclined to the horizontal. Since both cylinders 116 are connected to the same air pipe, the pressure of the four double levers against the projecting parts 118 can only be increased when all four levers are in the gripping position. This avoids the moulding box being shifted to both sides or to one side if the projecting parts 118 are at an equal height, and thus rejects or repair work are substantially reduced. The amount of pressure applied to cylinders 116 must be set at a maximum such that the said cylinders cannot raise the finished mould while it is being gripped, and at a minimum such that when the finished mould is being lifted off and carried, the double levers 115 do not slip off. If, for instance, recesses 119 are provided underneath the moulding box containing the finished mould 117, the double levers 115 can also grip the moulding box containing the mould 117 from below, as can easily be seen. The typical example illustrated in Figs. 11 and 12 is only suitable for the lifting off and swivelling of the finished mould box. It cannot be used for turning the finished mould over after the said mould has been lifted off the pattern equipment.

Figure 13:
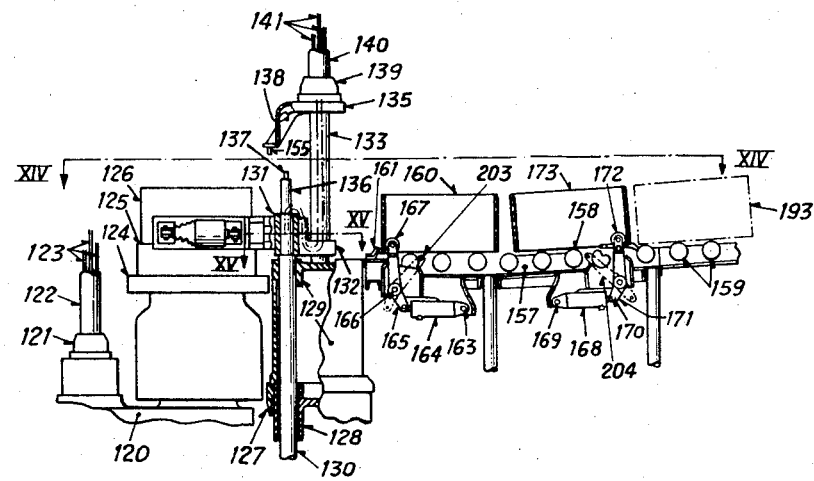
Fig. 13 is a general view of the feeding device for empty moulding boxes, partly in section along the line XIII—XIII in Fig 14.
Figure 14:
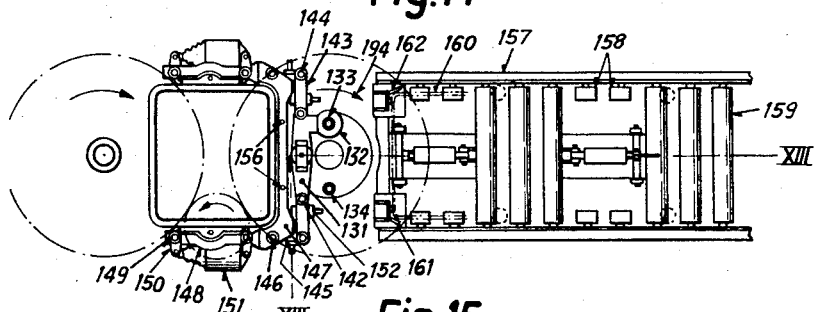
Fig. 14 is a plan view of Fig. 13, partly in section along the line XIV—XIV in Fig. 13.
Figure 15:
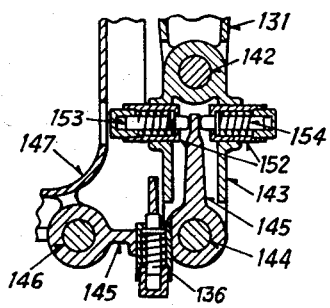
Fig. 15 is a section along the line XV—XV in Fig. 13.

Whereas the examples described hitherto serve to lift the mould from the pattern equipment and remove it from the turntable, Figs. 13, 14 and 15 illustrate an attachment which feeds the empty moulding boxes to the turntable and mounts them on the pattern equipment. 120 designates a turntable similar to the one marked 2 in Fig. 2, 121 is a rotary slide valve and 122 a holding tube in which air pipes 123 are fitted. The turntable 120 carries a mould table 124 on which there are disposed pattern equipment 125 and an empty moulding box 126. In the bushing 127, which, like the bushing 16 in Fig. 2, is firmly screwed to the machine frame, a rotary column 128 is rotatably located. Firmly connected to the said colmn is a fixture 129. Secured to the piston rod 130, which is guided in the rotary column 128 and the latter's fixture 129, is a cross-piece 131 which possesses a guide lug 132. The latter slides on the tube 133 which together with a second tube 134 carries a cross head 135. Arranged on the cross-piece 131 is a damper 136 which is constructed similar to the damper 89 in Fig. 4. The piston 137 of the damper 136 impinges, when the piston rod rises, on the stop 138 on the cross head 135. The latter carries a rotary slide valve 139 with a holding tube 140 in which are fitted air pipes 141. In order to be able to deposit the moulding box accurately on the pattern equipment, the grab is connected to the piston rod so that it is movable within certain limits. For this purpose two rocker levers 143 are swivelly located by means of bolts 142 on the crosspiece 131 (see also Fig. 15). Angle levers 145 are rotatably located in the rocker levers 143 by means of bolts 144. A part 147 is swivelly attached to the angle levers 145 via bolts 146. Firmly connected to the part 147 are arms 148 which carry bolts 149 and gripping levers 150. The gripping levers 150 are connected to a cylinder 151 of conventional design and to the said cylinder's piston rod. Two spring bushings 152 are provided in each of the rocker levers 143 and one spring bushing in each of the angle levers 145. The spring bushings 152 contain a bolt 153 and a spring 154. If the piston rod 130 rises and with it the crosspiece 131 and the parts secured thereto, two locking bolts 155 penetrate in the highest position of the stroke two corresponding holes 156 in the part 147.

A roller table 157, which possesses rollers 158 and roller cylinders 159, serves to feed the empty moulding boxes. The moulding box 160, which is in position ready to be gripped, bears against aligning members 161 and is held laterally by guides 162 which allow it the necessary amount of play. Flexibly attached to the roller table 157 by means of bolts 163 is a cylinder 164 of conventional design. The cylinder 164 is rigidly secured to a double lever 165 which is pivotally attached to the roller table 157 by means of bolts 166. When the cylinder 164 is actuated, the double lever 165 presses the moulding box 160 against the aligning members 161 with the aid of two rollers 167. Another cylinder 168 is pivotally attached with bolts 169 to the roller table 157 and with bolts 170 to a further double lever 171. When the cylinder 168 is actuated, the double lever 171 keeps the moulding box 173 at a distance from the moulding box 160 by means of the rollers 172, whereby all the boxes behind the moulding box 173 are prevented from sliding down along the inclined roller table. The attachment which is illustrated in Figs. 13 to 15 and serves to feed the empty moulding boxes to the turntable and to mount each of the said boxes on one of the pattern equipments, operates as follows:

A turntable 120 and a rotary column 127 are located similar to the turntable 2 and the rotary column 12 in the arrangement shown in Figs. 1 and 2. The manner in which they are interconnected for driving purposes does not differ from that described in the examples given hiterto. This interconnection is therefore not illustrated nor is its mode of operation described again here. On a roller table 157 are moulding boxes 173 and 193. These are kept at a distance from the empty, foremost moulding box 160 by a double lever 171 actuated by a cylinder 168 which is under pressure. The empty moulding box 160 between the guides 162 is forced against the aligning members 161 by the double levers 165 actuated by the cylinder 164 which is under pressure. Let is be assumed that the grab, which is carried by the piston rod 130, is in the raised position so that it stands above the moulding box 160 and the piston 137 thrusts against the stop surface 138. The already described gripping levers 150 are now in the open position because the cylinders 151 are not under pressure. The part 147, to which the grab is secured, is locked by the locking bolts 155 which are located in the holes 156. By means of the control unit the air is blown off in the cylinder so that the piston rod 130 drops into its lowest position. Also by means of the control unit pressure is applied to the cylinders 151 which grip the moulding box 160. Now by means of the control unit compressed-air is conveyed to beneath the piston rod 130 and thus the moulding box 160 is raised, the rollers 167 which are under pressure, rolling off along the internal surface of the moulding box. When the piston rod reaches its highest position, the part 147 is held firm laterally in an already known manner by means of the locking bolts 155. By actuating a slide valve which is not illustrated, the pressure in the cylinders 164 and 168 is drawn off. The double lever 165 is returned by the pressure of a spring into the position 203 which is marked with a dotted line, and the double lever 171 is returned in similar fashion to the dotted line position 204. After the moulding boxes 173, 193 and the following ones have, as a result of the partial slope in the roller table 157, rolled down against the aligning member 161 and after the moulding box 173 has touched the said aligning member, pressure is again fed to the cylinders 164 and 168 by operating slide valves accordingly. The double lever 165 returns into the position illustrated and presses the new moulding box against the aligning member, while the double lever 171 returns into the likewise illustrated position and again keeps the following moulding boxes at a distance from the one lying against the aligning member. During this and after the grab has in the manner already described been turned through 180° in the direction of the arrow 194 and the turntable has been revolved the distance from one mould table to the other, the piston rod 130 is lowered by means of the control unit. Thus the part 147 slides out of the locking bolts 155 and the moulding box is lowered on to the pattern equipment 125. The rocker levers 143 and the angle levers 145 allow the part 147 in the plane of the pattern equipment plate a limited freedom of motion in any direction in the said pattern equipment plate plane if the dowel guides of the moulding box 126 do not conform exactly to the dowels of the pattern equipment 125, corresponding bolts 153 being forced back against the pressure of their springs 154 if the position of the moulding box 126 does not conform to that of the pattern equipment 125. After the moulding box, 126, which is horizontally guided on being mounted on the pattern equipment 125, has reached its position on the said pattern equipment, pressure is blown off from the cylinders 151 by operating the control unit so that the gripping levers 150 open and the springs 154, which were forced through during the mounting process, return the slid back bolts 153 and thus the part 147 into the original, predetermined, spring-controlled position.

Now, by means of the control unit compressed-air is made to flow beneath the piston rod 130 and to raise the latter, whereupon, as in the processes described, the rotary column 127 is turned and thus the grab is swivelled over the roller table 157.

The attachment for feeding the empty moulding boxes and mounting them on the pattern equipment can, similar to the typical example shown in Figs. 9 and 10, also be designed as a two-cylinder arrangement. For feeding and mounting the empty moulding boxes, however, it is also possible to use a typical example of the invention wherein a piston rod carries two grabs. The moulding machine described according to the invention enables moulds to be manufactured fully automatically, the removal of the finished moulds at least being an automatic operation, while the feeding of the empty moulding boxes can also be effected half automatically or manually at choice.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A mechanism for handling mould boxes in connection with a moulding machine having an intermittently rotatable turntable which carries at least two pattern means and which is operatively connected to drive means; first and second grip means disposed at spaced locations adjacent said turntable for respective swivel movement relative to said turntable and each adapted to support a respective mould box, means operatively interconnecting said drive means with said grip means for actuating the latter in timed relation to the rotation of said turntable, to thereby successively cause engagement of said first grip means with one box, swivel said first grip means to a position above one of said pattern means on said turntable, and deposit said one box on said turntable prior to initiation of moulding operation, while said second grip means is actuated for engagement with another box in contact with the other pattern means upon completion of moulding operation thereon to remove said other box from said other pattern means and for deposit of said other box remote from said turntable, a rotary column supporting said second grip means, a first gear operatively connected to said column, said drive means including a drive gear operatively connected with said first gear, and a second gear meshing with said first gear, said drive gear meshing with said second gear.

2. A mechanism according to claim 1, further comprising conveyer means disposed adjacent said turntable and said first grip means for transporting said mould boxes when in empty condition to said first grip means, whereby the latter can remove said boxes successively from said conveyer means, and means operatively interconnecting said conveyer means with said turntable and said first grip means for actuation of said conveyer means in timed relation to said rotation of said turntable and actuation of said first grip means upon arrival of a pattern means of said turntable adjacent said conveyer means.

3. A mechanism according to claim 1, further comprising shock absorbing means operatively connected to said second grip means, and guide means operatively connected to said second grip means, whereby shockless and non-tilting gripping and lifting of said other mould box from said other pattern means is effected.

4. A mechanism according to claim 1, including coupling means operable selectively to connect said turntable with said drive gear for joint rotation and to disconnect said turntable from said drive gear for inhibiting rotation of said turntable, and means operatively connected to said coupling means to actuate the latter for disconnection of said drive gear from said turntable upon arrival of said other pattern means adjacent said second grip means.

5. A mechanism according to claim 4, the transmission ratio between said drive gear and said first gear being so predetermined that, during actuation of said coupling means to connect said drive gear with said turntable, said rotary column is rotated through an angle of 180°.

6. A mechanism according to claim 1, further comprising fluid-pressure cylinder eccentrically disposed within said column, a piston reciprocally movable within said cylinder, and a piston rod extending from said piston exteriorly of said cylinder, said second grip means being carried by said piston rod.

7. A mechanism according to claim 6, further comprising turnover head means interconnected between said piston rod and said second grip means, whereby said other mould box when supported by said second grip means may be inverted subsequent to being removed from said other pattern means.

8. A mechanism according to claim 7, further comprising actuating means disposed within said column and operatively connected with said turnover head means for effecting said inverting of said second grip means.

9. A mechanism according to claim 8, further comprising a coupling operatively interconnected between said actuating means and said turnover head means, fluid pressure means for controlling said coupling and selectively operating the latter to connect said actuating means to and disconnect said actuating means from said turnover head means, said actuating means being constructed to rotate said turnover head means through an angle of 180° upon operation of said coupling to interconnect said actuating means with said turnover head means.

10. A mechanism according to claim 6, further comprising damping means positioned adjacent said column and engageable by said piston rod at the termination of the movement thereof for raising said second grip means, whereby said raising movement may be stopped gradually and without injury to a mould carried by said second grip means.

11. A mechanism according to claim 6, further comprising fluid pressure actuated braking means positioned adjacent said column, said braking means being engageable by said second grip means upon downward movement thereof with said piston rod to regulate the speed of said downward movement.

12. A mechanism according to claim 6, further comprising additional conveyer means disposed adjacent said turntable and said second grip means and arranged to receive said other mould box from said second grip means subsequent to removal of said other mould box from said other pattern means, and fluid pressure actuated pushing means operatively connected with said additional conveyer means for moving said other mould box along said additional conveyer means when said box is deposited thereon by said second grip means.

13. A mechanism according to claim 12, said pushing means including a cross-piece arranged substantially transversely of said additional conveyer means, and stripping cam means on said cross-piece and engageable with said other mould box to remove the latter from the confines of said second grip means upon movement of said cross-piece longitudinally of said additional conveyer means.

14. A mechanism according to claim 13, further comprising a damping member connected to said cross-piece, whereby engagement between said stripping cam means and said other mould box is effected in a shock-free manner.

15. A mechanism according to claim 1, further comprising a pair of fluid pressure cylinders disposed in side by side relation within said column, a piston reciprocally movable within each of said cylinders, and a piston rod extending from each of said pistons exteriorly of its respective cylinder, said second grip means comprising a pair of gripping structures, said gripping structures being carried, respectively, by said piston rods.

16. A mechanism according to claim 1, further comprising an additional rotary column drivably connected with said drive means, a cylinder disposed within said additional column, a piston reciprocally movable within said cylinder, a piston rod extending from said piston exteriorly of said cylinder, said first grip means being connected with said piston rod.

17. A mechanism according to claim 16, said first grip means including clamping members pivotally connected to said piston rod for movement in a horizontal plane.

18. A mechanism according to claim 2, further comprising aligning members positioned on said conveyer means at the end thereof adjacent said turntable, and fluid pressure actuated pressing members operatively connected with said conveyer means and operable to press each mould box upon arrival thereof at said end against said aligning members, whereby accurate engagement of said first grip means with said mould box is insured.

19. A mechanism according to claim 18, further comprising additional fluid pressure actuated pressing members operatively connected with said conveyer means and engageable with additional mould boxes positioned on said conveyer means remote from said aligning members to maintain a predetermined spacing between said other mould boxes and that mould box in engagement with said aligning members.

References Cited in the file of this patent

UNITED STATES PATENTS

| | | |
|---|---|---|
| 1,570,658 | Wickland et al. | Jan. 26, 1926 |
| 1,707,411 | Nicholls | Apr. 2, 1929 |
| 1,726,023 | Harmes | Aug. 27, 1929 |
| 1,850,018 | Leyondre | Mar. 15, 1932 |
| 1,913,945 | Morris et al. | June 13, 1933 |
| 1,925,890 | Wilberz | Sept. 5, 1933 |
| 1,996,335 | Jones et al. | Apr. 2, 1935 |
| 2,112,830 | Corbin | Apr. 5, 1938 |
| 2,636,233 | Perkon | Apr. 28, 1953 |

FOREIGN PATENTS

| | | |
|---|---|---|
| 393,055 | Great Britain | June 1, 1933 |